July 18, 1933.  J. S. MacMULLEN  1,918,922
WINDSHIELD CONSTRUCTION
Filed Nov. 29, 1929   2 Sheets-Sheet 1
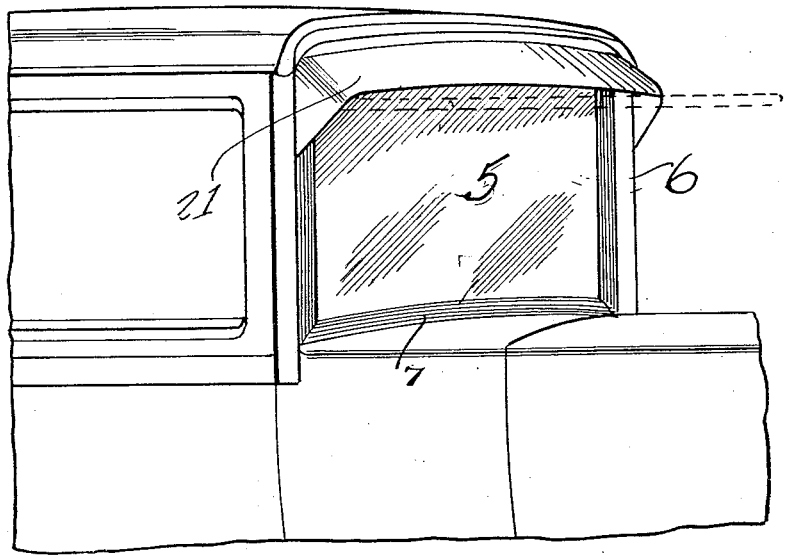
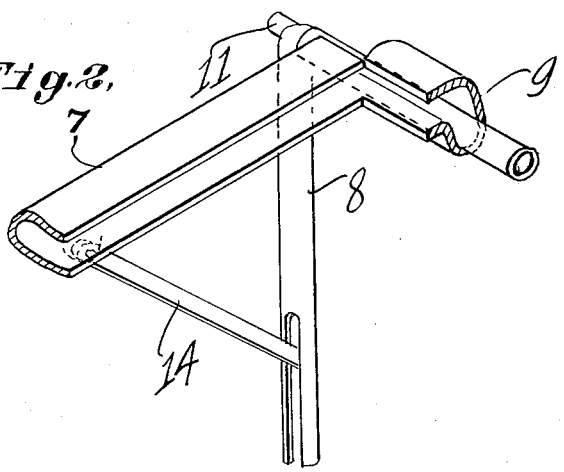
Inventor,
J. S. MacMULLEN
By Victor J. Evans
attorney.

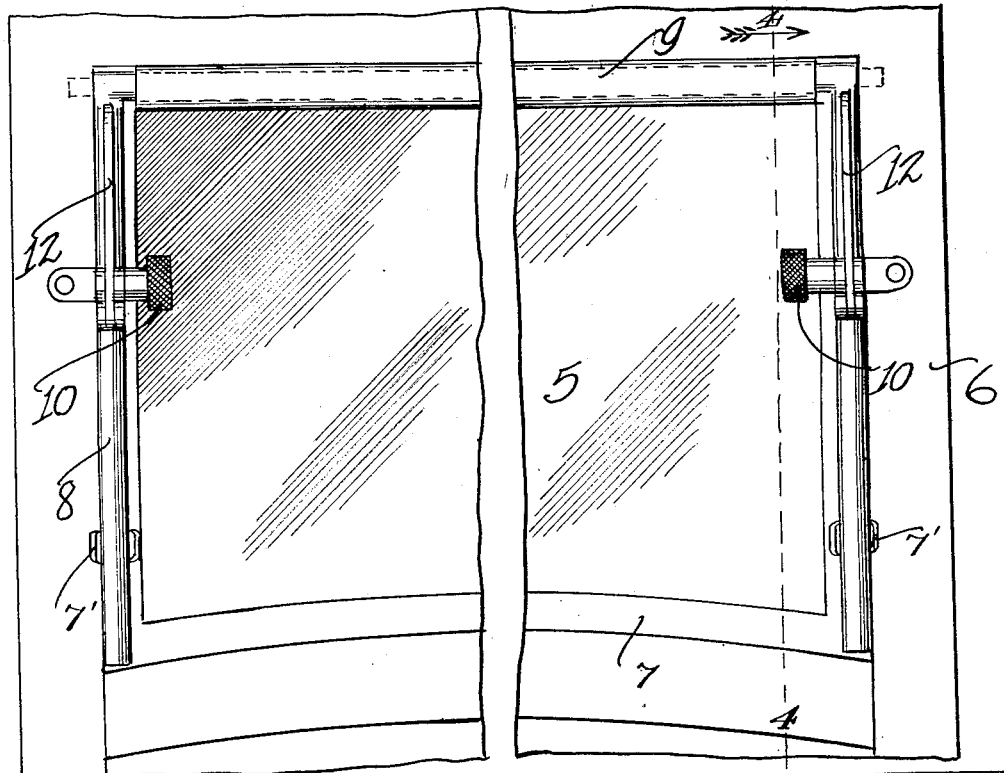
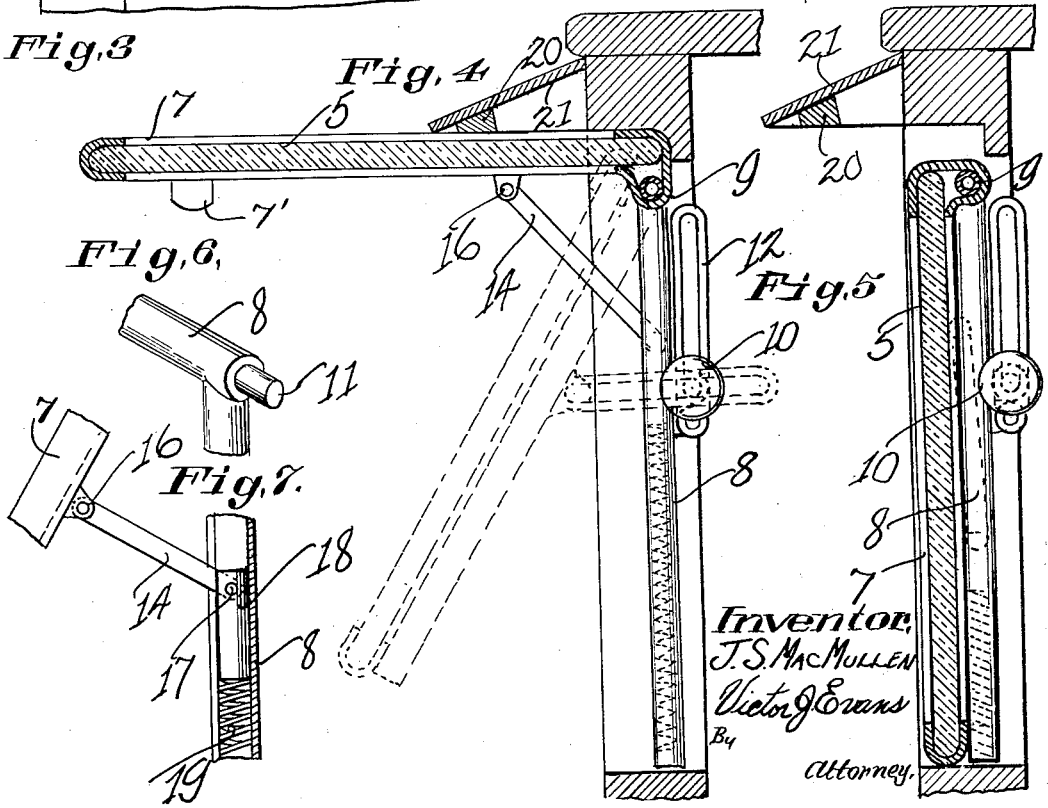

Patented July 18, 1933

1,918,922

UNITED STATES PATENT OFFICE

JOHN S. MacMULLEN, OF SAN FRANCISCO, CALIFORNIA

WINDSHIELD CONSTRUCTION

Application filed November 29, 1929. Serial No. 410,563.

This invention relates to improvements in windshields.

The principal object of the invention is to provide a windshield for a motor vehicle and the like that will move out of its normal position when impact is made with another vehicle or a stationary object so that in case of a collision, a person sitting in the front seat of the vehicle will not be thrown against the glass windshield and consequently cut.

Another object is to provide means whereby an automatic operation of the windshield will take place when such collision occurs.

A further object is to provide a windshield which will afford the usual protection against the elements.

A still further object is to provide a device of this character which will not increase the cost of applying the windshield to the car.

Other objects and advantages will be apparent during the course of the following description.

In the accompanying drawings forming a part of this specification, and in which like numerals are employed to designate like parts throughout the same, Figure 1 is a fragmentary detail perspective view of a portion of an automobile having my windshield applied thereto.

Figure 2 is a fragmentary detail perspective of the windshield frame in open positon, Figure 3 is a rear elevation of the windshield.

Figure 4 is a cross-sectional view taken on the line 4—4 of Figure 3, showing the windshield in open position, Figure 5 is a view similar to Figure 4, showing the windshield in closed position, Figure 6 is a fragmentary perspective view of one of the hinge members, and Figure 7 is a detail view showing the manner in which the spring plunger operates.

It is a well known fact that a great many people have been seriously injured due to the fact that when a collision occurs, the person sitting in the front seat is thrown against or through the windshield with the consequent breaking of the glass.

I have therefore devised a windshield wherein the force of the impact will cause the windshield as a whole to move from a vertical to a horizontal position and at a point just under the customary visor, with the result that the person within the vehicle to which my windshield is attached, may be projected through the windshield opening without contacting the glass.

In the accompanying drawings wherein for the purpose of illustration is shown a preferred embodiment of my invention, the numeral 5 designates an ordinary pane of glass, commonly found in windshields and the numeral 6 the frame of the vehicle into which the windshield is placed. This glass 5 is carried in a suitable channel member 7 which channel surrounds the entire glass pane and is hingedly secured to a window frame 8, through the expediency of forming the channel 7 along its upper edge into a semi-circular offset 9 (see particularly Figures 2 and 4). The channel member 7 carries thereon spring fingers 7' that serve to connect the channel to the frame 8.

The window frame 8 is pivoted through trunnions 11 to the vehicle 6. This frame 8 is adjustably held to the window frame by the customary thumb screw 10 and pivoted link 12, one end of which is connected to the frame 8, while the opposite end has a sliding connection with the thumb screw 10 which is secured to the window frame. This arrangement allows the windshield 5 to be swung outwardly and held between the link and thumb screw in adjusted position. In order to effect a quick release between the channel member 7 with the pane 5 therein, and the window frame 8 I provide a link at each end of the channel 7, which link is shown at 14.

The link 14 is pivoted as at 16 to the channel and as at 17 to a plunger 18 which bears against a spring 19 housed within the frame 8. The result of this construction is that under normal conditions the windshield 5 is in a vertical position as shown in Figure 5. When it is desired to have ventilation, the thumb nuts 11 are released and then the pane with the frame 8 may be swung to the dotted line position upon the trunnions 11 and locked in this adjusted position.

Assuming that the parts are in their normal position as shown in Figure 5 and the vehicle upon which the device is attached comes into engagement with an object and the vehicle is suddenly stopped, the inertia will cause the pane and channel member to overcome the toggle action of the spring 19 and to move to the full line position of Figure 4. The spring 19 assists in this movement as soon as the primary action has taken place and the impact will cause the fingers 7' to be disengaged from the frame 8.

To eliminate the danger of the glass 5 breaking and to absorb the shock of the contact of the glass with the top of the car when the windshield assumes an open position as shown in Figure 4, I have provided buffers 20 on the underside of the visor 21, or the top of the car as the case may be.

From the foregoing description considered in connection with the accompanying drawings, it will be evident that I have produced a windshield wherein the sudden stopping of the car due to collision, will throw the windshield entirely out of the normal path of an object passing through the windshield frame.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

Having thus described my invention, I claim:—

In a device of the character described, the combination of a motor vehicle having a windshield window frame, a pivoted frame mounted in said window frame, means for holding said pivoted frame in adjusted position about its pivot, a windshield carrying channel pivotally secured to said second mentioned frame, and spring means for causing said channel to move from a position parallel to said frame to a position parallel to the direction of travel of the motor vehicle, said spring means including a link extending between said channel and said pivoted frame, a plunger pivoted to said link and adapted to reciprocate in said pivoted frame, and a spring engaging said plunger for the purpose specified.

JOHN S. MacMULLEN.